Nov. 2, 1926.  
F. MAXWELL  
1,605,049  
ROLLER FOR SUGAR CANE MACHINERY  
Filed August 22, 1925  7 Sheets-Sheet 1

Inventor  
FRANCIS MAXWELL,  
Attorneys

Nov. 2, 1926.  F. MAXWELL  1,605,049
ROLLER FOR SUGAR CANE MACHINERY
Filed August 22, 1925   7 Sheets-Sheet 2

Francis Maxwell,

Nov. 2, 1926.  1,605,049
F. MAXWELL
ROLLER FOR SUGAR CANE MACHINERY
Filed August 22, 1925    7 Sheets-Sheet 4

Inventor
FRANCIS MAXWELL,
Attorneys

Nov. 2, 1926.  
F. MAXWELL  
1,605,049  
ROLLER FOR SUGAR CANE MACHINERY  
Filed August 22, 1925  7 Sheets-Sheet 5

Inventor  
FRANCIS MAXWELL,  
Toulmin & Toulmin,  
Attorneys

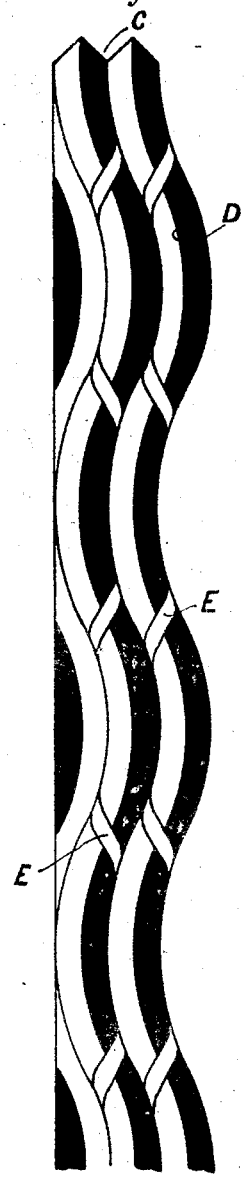
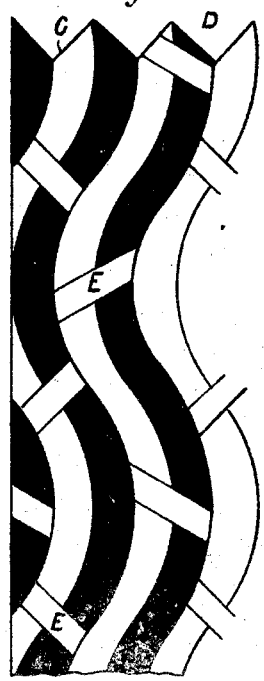
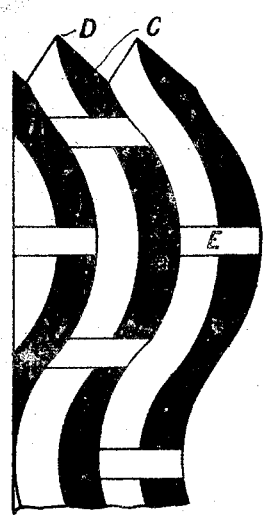

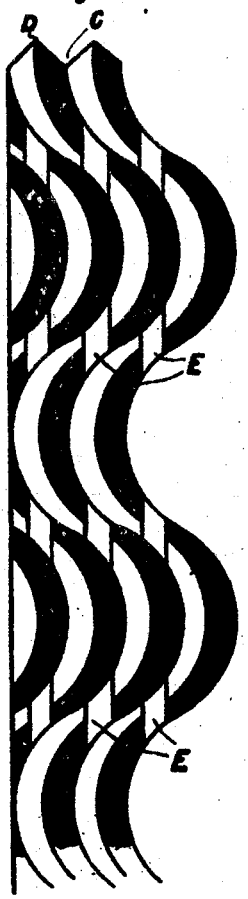

Patented Nov. 2, 1926.

1,605,049

UNITED STATES PATENT OFFICE.

FRANCIS MAXWELL, OF WALLINGTON, ENGLAND.

ROLLER FOR SUGAR-CANE MACHINERY.

Application filed August 22, 1925, Serial No. 51,803, and in Great Britain September 5, 1924.

The peripheral faces of the rollers, at present generally used in sugar-cane crushing machinery, are formed with alternate straight grooves and ridges which together constitute teeth, the ridges being of a blunt V-shaped or similar cross-section. The grooves and ridges or teeth are arranged in a variety of ways; sometimes, for instance, they are continuous and parallel, and sometimes they are of an interrupted, or of a zig-zag, or of a chevron-like formation. However, whatever the form and arrangement, the grooves and ridges usually run axially, circumferentially or helically. Sometimes, again, the roller face is divided into sections or areas provided with short grooves and ridges or teeth, neighbouring sections or areas being variously co-related, presenting a plurality of regular or irregular geometrical patterns.

These arrangements of straight grooves and ridges or teeth are defective in practice, because the cane, which is itself substantially straight, tends to slip and so momentarily or completely fails to enter the grooves, while the cane, as it is crushed, is apt to collapse as straight portions into the grooves and become lodged therein, consequently, due to the protection afforded by the ridges, which constitute walls to the grooves, it escapes full disintegration. Therefore, the feeding and crushing of the cane are rendered more or less imperfect.

The object of my invention is to obviate these disadvantages, and to this end I provide the rollers with curved grooves and ridges or teeth constituting a wavy formation or structure, which may be continuous or interrupted. The general direction of the grooves and ridges or teeth is, as at present, helically, axially, circumferentially, or otherwise disposed, but, in every case, a positive waviness is superimposed on this general direction, whereby the straight cane is gripped more effectively and pressed out of its straight shape and is thereby distorted, bruised and defibrated more effectively than in the known constructions. Free and efficient extraction of the juice accrues in consequence.

The ridges between the grooves are, with advantage, notched so as to form communicating passages from groove to groove for the flow of the juice, and for gripping the cane, the notches being constituted as cross-cut grooves relatively to the other grooves. Thus the latter grooves may, conveniently, be termed the principal grooves, and the other grooves the subsidiary grooves. The subsidiary grooves may be arranged to take any desired course or direction; preferably, however, they are directed along wavy or curved or staggered lines or paths which may be continuous or interrupted.

Rollers embodying my invention are adapted for service in any of the well-understood ways as will be obvious, though it is, perhaps, appropriate to here briefly indicate some of these known arrangements. Thus, in a train of mills, the rollers of the first or initial mill have the hardest duty to perform inasmuch as the cane arrives as a bulky tangled layer with its fibrous resistance unimpaired, but at each successive crushing the bulk and the resistance decrease. Consequently, these initial rollers are equipped with the largest grooves and ridges or teeth of, for example, zig-zag axial form. The subsequent rollers are often furnished with smaller grooves and ridges or teeth of a dissimilar kind. Several distinct grooved and ridged or toothed constructions, as previously outlined, are thus employed in connection with the rollers of a train of mills for the dual purpose of gripping the cane and powerfully drawing it into the rollers, and of submitting the cane to several distinct kinds of disintegration. These rollers, whatever their kind, are adapted to crush the cane against companion rollers which are comparatively smooth, or against rollers which are differently grooved and ridged or toothed, and, therefore, not capable of intermeshing; or two companion or co-active rollers are so formed that the grooves and ridges or teeth of one intermesh more or less completely with the grooves and ridges or teeth of the other. In the latter event, the co-active rollers are exact duplicates of one another, or are different and yet so formed that the grooves and ridges or teeth on one intermesh with ridges and grooves or teeth on the other.

My invention will be clearly comprehended from the accompanying diagrammatic drawings to which I will now refer, and which show several typical examples of rollers embodying it. Of the several figures, Fig. 1 is a fragmentary view of one construction of roller, while Figs. 2, 3, 4, 5 and 6 are views representing the developed grooved and ridged or toothed faces of sundry rollers designed for various services, and Figs. 7, 8, 9, 10 and 11 are further fragmentary views showing modifications of the roller represented in Fig. 1.

Referring, first, generically to the various figures, where applied, A—B denotes the longitudinal axis of each roller; C the principal grooves; D the ridges complemental to the grooves C; and E the subsidiary or connecting cross-cut grooves or notches.

I will now refer specifically to the several figures.

Figs. 1, 7, 8, 9, 10 and 11 illustrate a roller particularly suitable for initially crushing the cane, the principal grooves C and the ridges D running circumferentially. The subsidiary grooves E may run in various ways to meet requirements; for instance, they may run obliquely and reversely as in Figs. 1 and 7; or more or less axially and in staggered relation as in Figs. 8 and 9; or circumferentially as in Figs. 10 and 11.

Fig. 2 represents a roller wherein the grooves C and E are counterpartal and run helically in two intersecting series of opposite hand, the ridges D, in consequence, assuming the form of a plurality of spaced pyramids. Thus there may be said to be two series of the grooves C, whereof one series functions as, or substitutes, the grooves E. This roller may immediately succeed the roller shown in Fig. 1, or may be used in place of it.

Fig. 3 depicts a roller which may be adopted as a substitute for either of the two rollers just described, or may follow that illustrated in Fig. 2. The grooves C and ridges D run, relatively to the circumferential medial line, helically right and left handedly, while the grooves or notches E run in staggered rows transversely thereto.

Fig. 4 represents a roller which likewise may be used as a substitute for any of the preceding rollers, or in succession to the roller illustrated in Fig. 3. The figure shows the surface subdivided by the grooves E into geometrical patterns, areas or sections bearing the short grooves C and ridges D which are diversely directioned and positioned. The grooves E follow a continuous wavy path.

Figure 1:
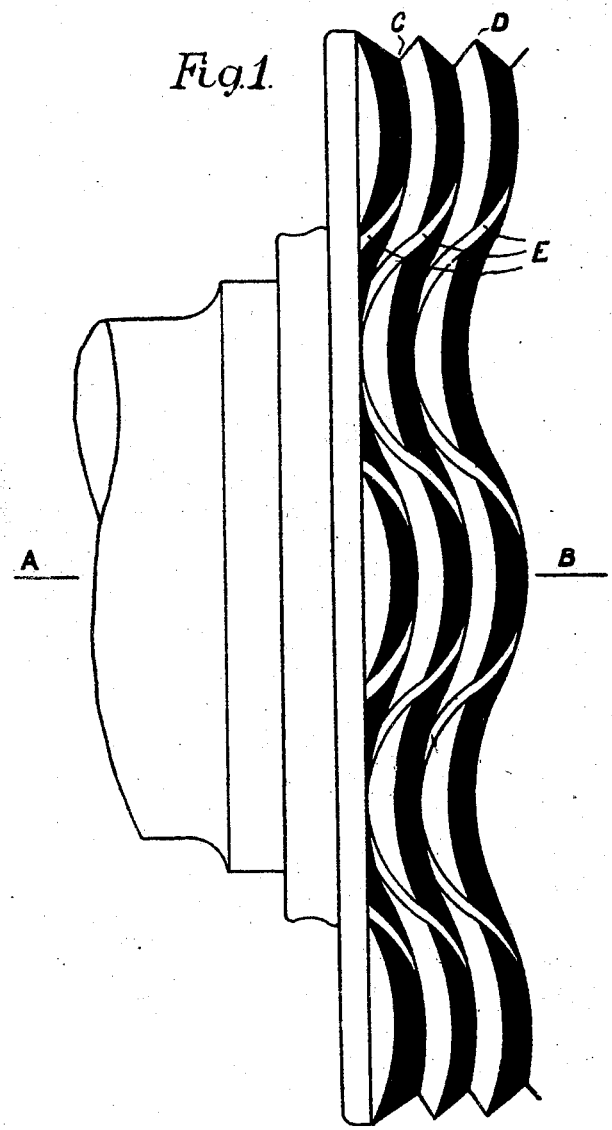
Figure 2:
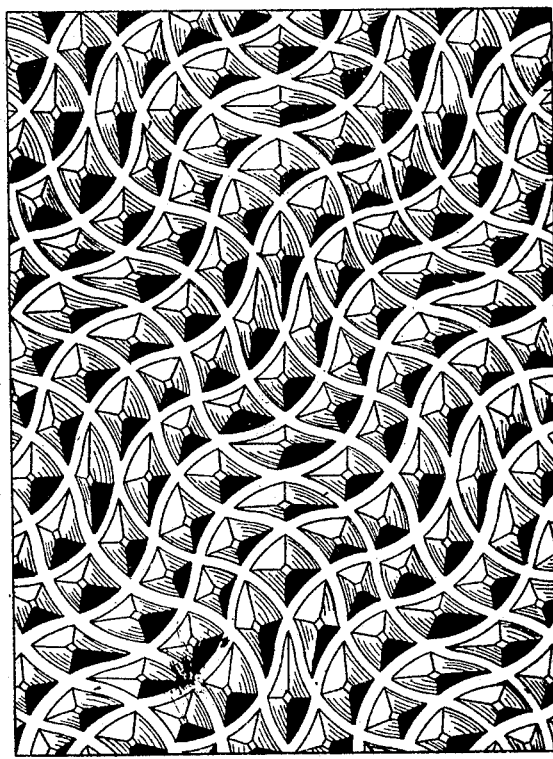
Figure 3:
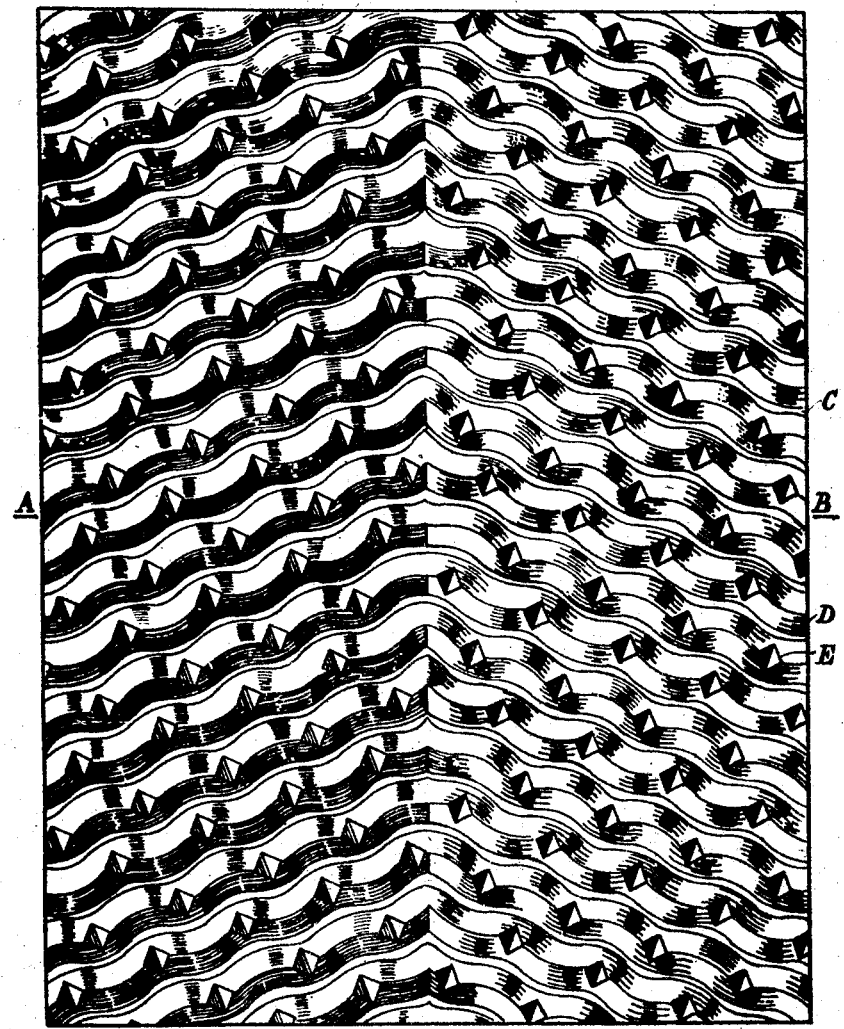
Figure 4:
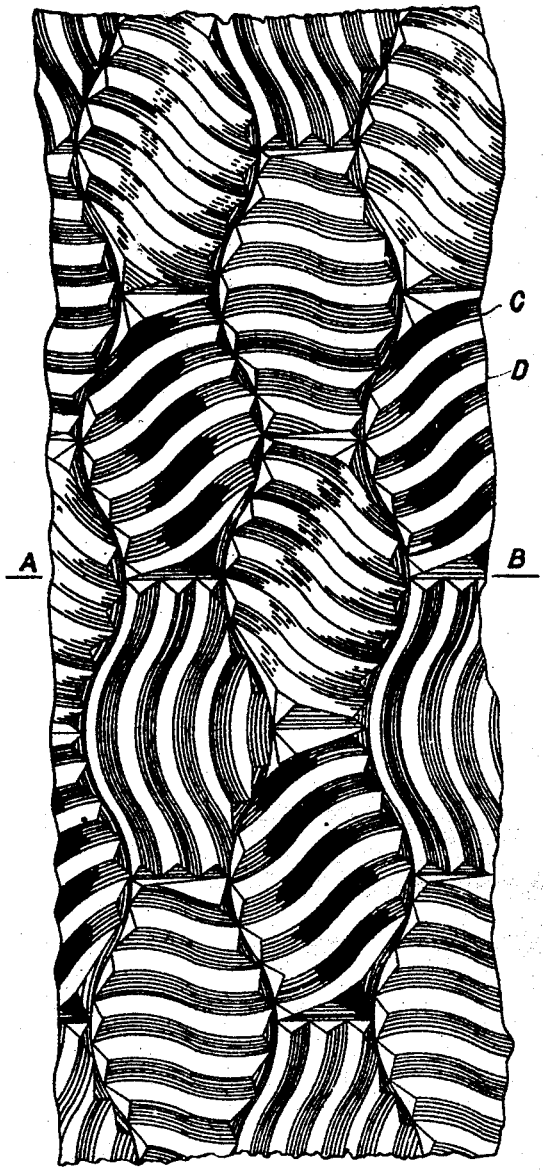
Figure 5:
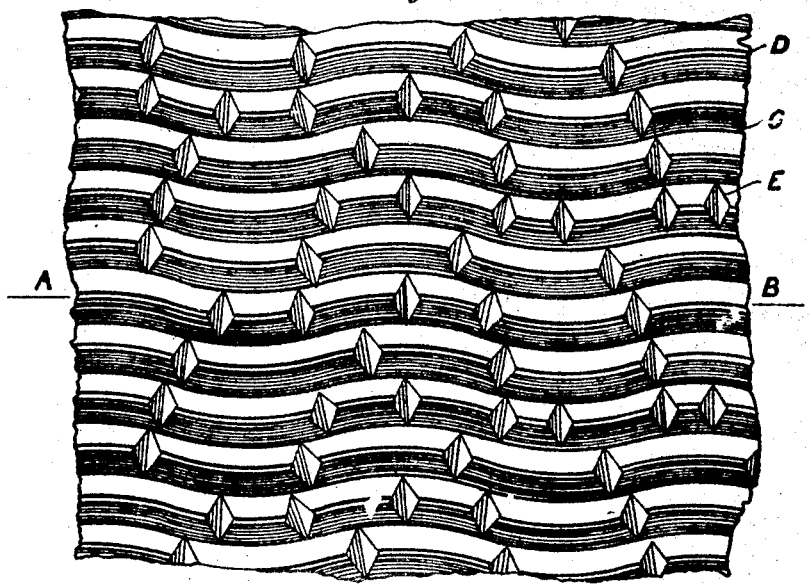
Fig. 5 illustrates a roller with the grooves C and ridges D running axially, and the subsidiary grooves or notches E irregularly staggered. This roller may be used in succession to any of the preceding rollers, or as a substitute for any of them.
Figure 6:
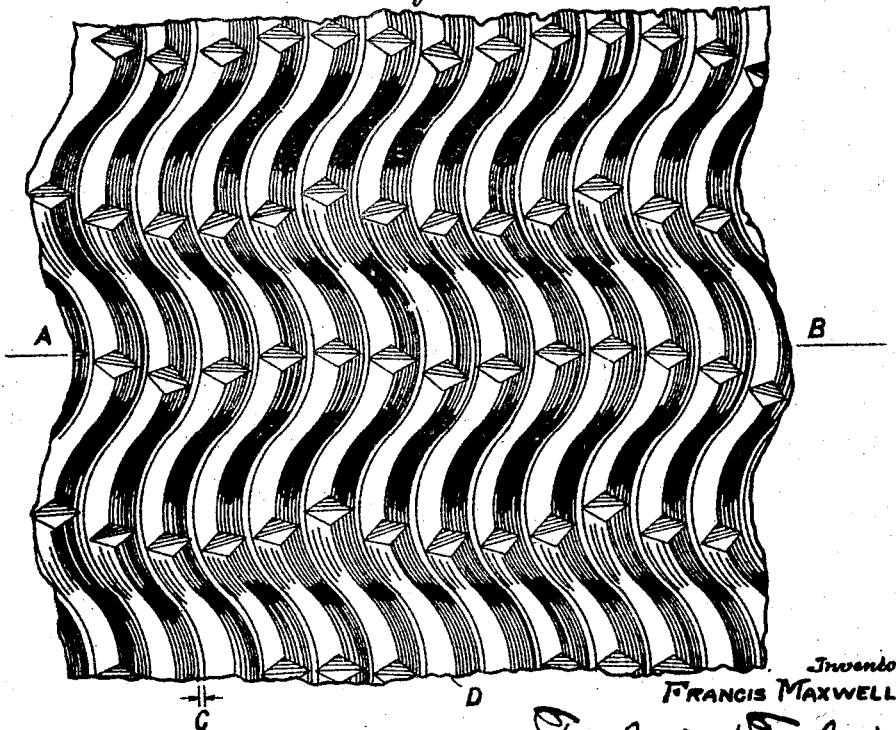
Fig. 6 shows a roller especially appropriate as a roller in a later mill of a train of mills. The grooves C and the ridges D run circumferentially, while the grooves E run axially in a broken wavy line.

What I claim and desire to secure by Letters Patent is:—

1. A roller for sugar-cane machinery having a grooved and ridged peripheral face, characterized in that the grooves and ridges are of wavy formation circumferentially, and are provided with positive interconnecting passages.

2. A roller for sugar-cane machinery having a series of principal grooves of wavy formation running circumferentially, in combination with a series of subsidiary grooves in transverse relation with said principal grooves and establishing communication between them.

In testimony whereof I affix my signature.

FRANCIS MAXWELL.